United States Patent [19]

Manda et al.

[11] Patent Number: 5,228,643
[45] Date of Patent: Jul. 20, 1993

[54] ENERGY-EXCHANGE SYSTEM INCORPORATING SMALL-DIAMETER TUBES

[75] Inventors: Leo J. Manda, Florissant; Michael J. Lavorando, Chesterfield, both of Mo.

[73] Assignee: McDonnell Douglas Corporation, St. Louis, Mo.

[21] Appl. No.: 904,148

[22] Filed: Jun. 25, 1992

[51] Int. Cl.[5] ............................................. B64D 15/00
[52] U.S. Cl. .............................. 244/134 B; 244/134 R
[58] Field of Search ............................ 244/134 B, 134 R

[56] References Cited

U.S. PATENT DOCUMENTS

| | | | |
|---|---|---|---|
| 2,820,601 | 1/1958 | Crawford | 244/134 B |
| 3,917,193 | 11/1975 | Raunels, Jr. | 244/134 B |
| 4,099,691 | 7/1978 | Swanson et al. | 244/134 B |
| 5,011,098 | 4/1991 | McClarin et al. | 244/134 B |

OTHER PUBLICATIONS

L. J. Stoffer, et al Evaluation of Capillary Reinforced Composites Sep. 1984–Sep. 1985.

S. W. Ciardullo, et al; Evaluation of Capillary Reinforced Composites for Anti–Icing; Jan. 87

*Primary Examiner*—Joseph F. Peters, Jr.
*Assistant Examiner*—Christopher P. Ellis
*Attorney, Agent, or Firm*—Timothy H. Courson; Guy R. Gosnell; Benjamin Hudson, Jr.

[57] ABSTRACT

A capillary-tube energy-exchange system for transferring energy to or from an aircraft surface is comprised of inlet and exhaust manifolds interconnected by a plurality of Teflon capillary tubes. Fluid, either liquid or gas, is transferred from the inlet manifold through the capillary tubes to the exhaust manifold. During the fluid's flow, energy is transferred, typically from a warm fluid to an outer skin, in order to protect the aircraft's surface from ice accretions. The capillary tubes may be connected directly to ports formed in the manifolds; or, preferably, a chamber may be formed between the manifolds and the ends of the capillary tubes in order to transfer fluid therethrough. The energy-exchange system may be either an open or closed system.

12 Claims, 1 Drawing Sheet

ENERGY-EXCHANGE SYSTEM INCORPORATING SMALL-DIAMETER TUBES

BACKGROUND OF THE INVENTION

This invention generally relates to energy-exchange systems, and more particularly to energy-exchange systems utilizing relatively small-diameter, or "capillary", tubes incorporated beneath the skin of an aircraft.

Aircraft desirably operate in all weather conditions, including very low temperature conditions in which ice may tend to accrete upon an aircraft surface. This ice accretion occurs particularly along the leading edges of the aircraft, such as along the forward portion of the aircraft wing. It is desirable to either remove the ice following its accretion (de-icing) or, more preferably, to prevent the ice from accreting (anti-icing), because it may interfere with the proper aerodynamic function of the aircraft or increase the aircraft's weight. It is also preferable that ice be prevented from accreting because the ice, during its removal, may damage aircraft components with which it would collide downstream.

Several alternative approaches have been proposed to provide thermal anti-icing systems for aircraft, including that disclosed in U.S. Pat. No. 5,011,098 issued to McClarin, et al, in which portions of the aircraft surface for which anti-icing is desired are comprised of an integrated skin having passageways formed therein in which heated fluid may be passed. The anti-icing system of the McClarin patent requires integrated inner and outer skins, however, so as to limit the flexibility of the designer in determining the aircraft's structure. Additionally, the large cavity between the inner and outer skins would make effective use of a liquid working fluid difficult due to the additional weight of the liquid.

A structural cooling unit has been disclosed by Niggemann in U.S. Pat. No. 4,786,015 in which an aircraft's leading edges and nose cones have a helically wound metallic tube formed within their exterior surfaces to form a single flow path incorporated therein. Such a cooling unit as that described by Niggemann would both be difficult to fabricate and result in variable cooling. Because only a single coolant path is provided, the coolant would gradually absorb heat from the aircraft's outer surface, and thus have its ability to cool the portion of aircraft's surface located downstream impaired.

U.S. Pat. No. 2,645,435 issued to Pouit discloses another energy-exchange system for an aircraft's leading edge in which passageways are formed by internal reinforcements within a double-wall structure in order to transport fluids therein. Such a structure requires double walls for the aircraft's leading edge, so as to restrict the designer's flexibility in choosing alternative structural designs.

An aircraft anti-icing plenum is disclosed by Cook, et al in U.S. Pat. No. 3,933,327 in which the leading edge of a jet engine nacelle is fabricated to prevent formation of ice thereon. Such a design as that illustrated in U.S. Pat. No. 3,933,327 requires a double-wall construction for the leading edge, however, and would be unsuitable for use with a liquid working fluid, as the fluid is exhausted to atmosphere following its traversal through the energy-exchange system. The exhaust of a liquid working fluid at the leading edge of an aircraft engine may cause difficulties with aircraft components which the exhausted liquid would contact downstream. Additionally, the large plenum filled with a liquid would weigh a substantial amount and cause increased weight for the aircraft to carry.

General Electric Company, in a report entitled *Evaluation of Capillary Reinforced Composites* submitted to the National Astronautics and Space Administration (NASA) under contract number NASA-CR175061 for the period from September 1984 through September 1985, as well as an article by Ciardullo, et al of General Electric Company entitled *Evaluation of Capillary Reinforced Composites for Anti-Icing* submitted at the AIAA 25th Aerospace Sciences meeting held Jan. 12-15, 1987, disclosed the use of glass capillary tubes for exchanging energy with composite skins. The use of glass tubes disclosed by the General Electric reports suffers from several deficiencies, including the susceptibility of glass to long-term stress corrosion and contamination corrosion and the difficulty in bending glass tubes to hold a relatively small radius of curvature. An additional difficulty with the General Electric design occurs in the connection of the glass capillary tubes with the fluid supply or fluid return plenums. The GE design involved passing the glass tubes through an inner wall of the structure, which necessitates complicated fabrication procedures.

It would be desirable, therefore, to develop an energy-exchange system for use with aircraft surfaces having only a single outer skin. It would also be desirable to develop an energy-exchange system in which small-diameter tubes formed to have small radii of curvature and being relatively impervious to stress corrosion and contamination corrosion could be utilized. Additionally, it would be desirable if an energy-exchange system could be developed utilizing a fluid which may be selected from either liquids or gases, in order to maximize the efficiency of the energy-exchange process.

SUMMARY

There is provided by this invention an energy-exchange system utilizing relatively small-diameter tubes, such as capillary tubes, for transferring energy to or from an aircraft surface, such as a leading-edge surface. A first embodiment of the energy-exchange system employs inlet and exhaust manifolds interconnected by a plurality of substantially parallel capillary tubes. The Teflon capillary tubes are held in place relative to one another and are bonded to an outer skin by an adhesive.

Fluid enters the inlet manifold through an input conduit, and is subsequently passed through the capillary tubes to transfer energy to or from the outer skin prior to its receipt by the exhaust manifold. Fluid which exits the exhaust manifold through the output conduit is either expelled from the aircraft, if the system is open, or recirculated through the system following its flow through a heat exchanger, in a closed system. If the system is open, a source of fluid is required, such as air bled from the aircraft's engine. If required, a pump means can be employed to circulate the working fluid.

The tubes may be connected directly to ports in the manifolds. Preferably, however, they terminate in chambers formed at the ends of the tubes, adjacent to the manifolds, to allow more efficient fabrication of the energy-exchange system, to eliminate any sealing problems, and to minimize any problems caused by differential thermal expansions or contractions. Additionally, due to the use of Teflon tubes, a wide variety of fluids, either liquid or gas, may be circulated therein.

A second embodiment of the energy-exchange system is disclosed which also employs inlet and exhaust manifolds interconnected by Teflon capillary tubes. The plurality of capillary tubes is arranged such that fluid entering the inlet manifold is directed through a first set of capillary tubes, positioned near the center of the cavity defined by the outer skin, to the most forward portion of the leading edge, which generally requires the largest energy exchange. Two additional sets of capillary tubes are also connected with the most forward portion of the leading edge, and are bonded to the outer skin. The two additional sets of tubes are arranged to transfer fluid to the exhaust manifold for disposal. Such a second embodiment may be either an open or closed system, and may employ a wide variety of working fluids, either liquid or gas.

While the energy-exchange system typically circulates warm fluids to protect the aircraft from ice accretion, cold fluids may also be circulated therethrough in order to cool the aircraft's outer skin if it becomes warmer than desired.

DETAILED DESCRIPTION OF THE PREFERRED EMBODIMENT

Figure 1:
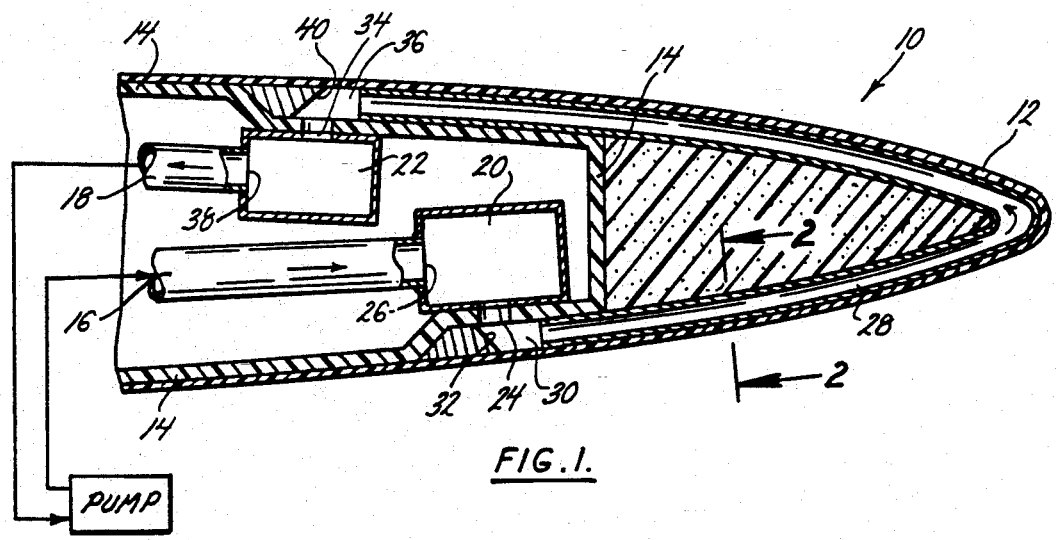
FIG. 1 is a cross-sectional view of a leading edge of an aircraft employing a capillary-tube energy-exchange system of the present invention.

As shown in cross section in FIG. 1, an energy-exchange system 10 utilizing relatively small-diameter tubes, such as capillary tubes, is comprised of tubes interconnecting a pair of manifolds. The tubes are formed of polytetrafluoroethylene or Teflon, a registered trademark of E. I. Dupont De Nemours & Company. Fluid may be pumped through the system by means of a pump, which is not shown in FIG. 1, but which is well known to those skilled in the art. The system may be a closed system, in which the fluid in the system is constantly recirculated, without the addition or substraction of any further fluid. Alternatively, the system may be an open system, in which the fluid exits the system after traversing the network of capillary tubes.

The system 10 as illustrated is confined within a leading edge of an aircraft, such as the forward edge of an aircraft wing as shown in cross section in FIG. 1. However, the system 10 may also be utilized in conjunction with other aircraft surfaces. The wing typically has an outer skin 12 formed of a composite material and an inner skin, although the use of the inner skin is optional with the subsequently described capillary-tube energy-exchange system 10. Within the outer skin 12, a supporting structural member 14 is located to provide additional structural stability to the leading edge.

Within the cavity defined by the supporting structural member 14 are one or more input conduits 16 and one or more output conduits 18 which are connected to the inlet and exhaust manifolds, 20 and 22 respectively. The input conduits 16 are tubes of relatively large diameter in comparison to the capillary tubes, for allowing the working fluid to be transferred to the inlet manifold. Once the working fluid has reached the inlet manifold 20, the fluid exits therefrom through multiple outlet ports 24 formed in a sidewall of the inlet manifold 20. The inlet manifold 20 is a pressure vessel having one or more large input ports 26 with which the input conduits 16 are connected, and multiple outlet ports 24 formed in the sidewall of the inlet manifold 20, which is in contact with the supporting structural member 14 of the leading edge. Holes are also formed in the supporting structural member 14 and aligned with the outlet ports 24 of the inlet manifold 20 such that fluid entering the inlet manifold 20 through the input conduit 16 may be transferred through the outlet ports of the inlet manifold 20 and the holes in the supporting structural member wall.

Figure 2:
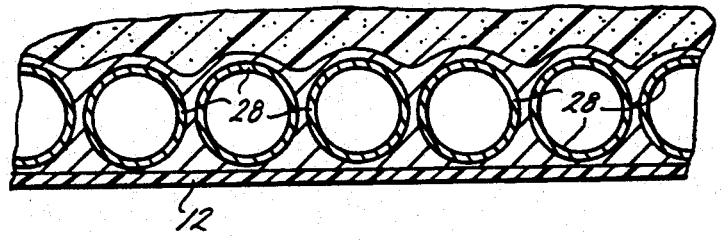
FIG. 2 is a cross-sectional view of the capillary tubes being held in place by adhesive, taken along line 2—2 in FIG. 1.

A plurality of capillary tubes 28, placed in a substantially parallel relationship with respect to one another, trace the shape of the outer skin 12 forming the leading edge. The tubes 28 are held in place in relation to one another, as well as being affixed to the outer skin 12 of the leading edge, by means of an adhesive, preferably an epoxy adhesive, which fills the space between the tubes 28 and bonds the tubes 28 to the outer skin 12, as shown in FIG. 2.

While the tubes 28 may be formed such that they connect with the outlet ports of the inlet manifold, with one tube connecting to each outlet port, such an assembly involves sophisticated and time-consuming fabrication steps, and complicates sealing and thermal-expansion issues. Therefore, the first end of the tubes 28 need not be connected to the outlet ports 24 of the inlet manifold 20, but preferably terminate a short distance from the holes in the supporting structural member wall, and form one wall of a chamber or plenum 30, as shown in FIG. 1. The chamber 30 between the outlet ports 24 of the inlet manifold 20 and the tubes 28 is formed between the wall of the supporting structural member 14, the outer skin 12 of the leading edge, the combination of the tubes 28 and the adhesive filling the space between adjacent tubes, and a rear wall 32 which connects the supporting structural member 14 to the outer skin 12. Thus, the fluid which exits the inlet manifold 20 through its outlet ports 24 flows through the chamber 30 and into the awaiting capillary tubes 28. In this fashion, fluid may be readily transferred from the inlet manifold 20 to the capillary tubes 28 without the complicated and inefficient fabrication procedures which would be required to directly connect the capillary tubes 28 to the inlet manifold 20.

The second ends of the capillary tubes 28 terminate either by being connected to an inlet port 34 of the exhaust manifold 22 or, preferably, in a chamber 36 positioned adjacent the exhaust manifold 22. The exhaust manifold 22 is a pressure vessel of similar construction to the inlet manifold 20 previously described, and is affixed to the inner surface of a wall of the supporting structural member 14. The exhaust manifold 22 has one or more relatively large outlet ports 38 for connection with the outlet conduits 18, and multiple inlet ports 34 formed through the wall of the exhaust manifold 22 which is in contact with the supporting structural member wall. Holes are also formed in the supporting structural member wall and axially aligned with the inlet ports 34 of the exhaust manifold 22. While the second ends of the capillary tubes 28 may be connected to the inlet ports 34 of the exhaust manifold 22 in a like manner to that in which the first ends of the tubes 28 may be connected to the outlet ports 24 of the inlet manifold 20, such a fabrication procedure is time-consuming. Preferably, a chamber or plenum 36 may be formed adjacent the exhaust manifold 22 in a like manner to that described previously in relation to chamber 30. Thus, the capillary tubes 28 may terminate in the cavity 36 which is bounded by the supporting structural member 14, the outer skin 12, the rear wall 40 formed between the supporting structural member and the outer skin 12, and the tubes 28 themselves with adhesive filling the space between the tubes 28. The fluid from the tubes 28 thus flows from the capillary tubes 28, through the cavity 36, and into the exhaust manifold 22 through its inlet ports 34. The fluid is then transferred from the exhaust manifold 22, through its outlet ports 38 and into the outlet conduits 18, for disposal in an open system, or recirculation in a closed system, after being passed through a heat-exchange means.

Figure 3:
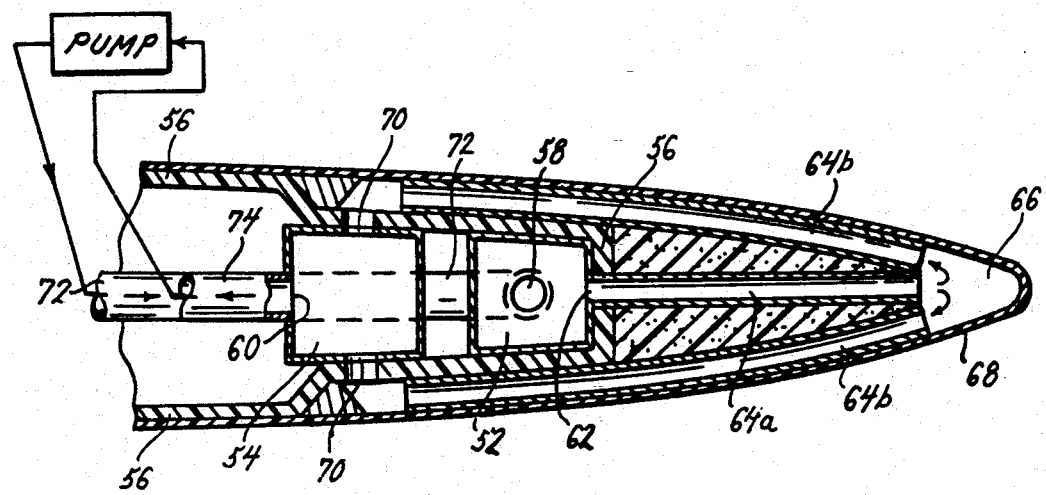
FIG. 3 is a cross-sectional view of a leading edge of an aircraft employing a second embodiment of the capillary-tube energy-exchange system.

A second embodiment is illustrated in FIG. 3 which re-positions the elements of the capillary-tube energy-exchange system in order to introduce the fluid at the most forward portion of the leading edge. Such introduction of the fluid is desirable, as the most forward portion of the leading edge generally requires the largest energy transfer. Moreover, the inlet and exhaust manifolds 52 and 54 respectively may each constitute a part of the supporting structural member 56. In any event, manifolds 52 and 54 have dimensions allowing them to be attached to both oppositely disposed sidewalls of the supporting structural member 56. The ends of the inlet and exhaust manifolds, 52 and 54 respectively, are connected to inlet and outlet conduits, 72 and 74 respectively, for receipt and disposal of the working fluid. The inlet manifold 52 has one or more outlet ports 62 which are axially aligned with holes formed within the supporting structural member wall. The first ends of a first set of capillary tubes 64a are connected to these outlet ports 62. The plurality of capillary tubes 64a are arranged in a substantially parallel relationship, and are held in position relative to one another with an adhesive. The capillary tubes 64a connect the outlet ports 62 of the inlet manifold 52 to a cavity 66 at the most forward portion of the leading edge. Capillary tubes 64a extend through the center of the cavity formed by the outer skin 68 such that the fluid flowing therethrough does not have a substantial energy change prior to reaching cavity 66. The cavity 66 at the most forward portion of the leading edge is also connected to the first ends of two sets of capillary tubes 64b, with each set having a plurality of substantially parallel capillary tubes 64b which are bonded to the inner surface of the outer skin 68 and held in a fixed relation to one another by an adhesive. The capillary tubes 64b trace the shape of the outer skin 68, and are connected at their second end to inlet ports 70 of the exhaust manifold 54. Two sets of inlet ports 70 with each set having one or more ports are utilized for connection with the two sets of capillary tubes 64b from cavity 66. The second ends of the capillary tubes 64b may be connected directly to the inlet ports 70 of the exhaust manifold 54, or preferably, a cavity may be formed as previously explained in relation to the first embodiment illustrated in FIG. 1 between the supporting structural member 56, the outer skin 68, a rear wall between the supporting structural member 56 and the outer skin 68, and the combination of the tubes 64b and the adhesive filling the spaces between the tubes 64b. Optionally, output ports 60 connect the exhaust manifold 54 to the output conduits 74 for transferring the fluid collected from the capillary tubes 64b into the output conduits 74 for subsequent disposal or recirculation.

The tubes utilized in the capillary-tube energy-exchange system are preferably formed from Teflon, although materials such as nylon and rayon may also be used. Teflon tubes are preferred for several reasons. First, they may be formed to have very small radii of curvature, such that they may follow the outline of a leading edge having a very sharply curved forward portion. For example, Teflon tubes having radii of curvature as small as 1/16 of an inch may be readily formed. Additionally, Teflon tubes have a very low coefficient of friction, such that the opportunities for the fluid being circulated within the Teflon tubes to clog is significantly decreased, if not eliminated. Additionally, the exterior of the Teflon tubes are etched with sodium napthalene, which enables the etched tubes to be bonded with an adhesive to an outer skin formed of a composite material. Teflon tubes are also desirable because they can withstand a wide range of temperature, such as from $-275°$ F. to $500°$ F., which is particularly important for an energy-exchange system which can be used for either heating or cooling. The structure of the Teflon renders it impervious to chemical contamination or corrosion by most substances, to allow a wide choice of working fluids selected from either liquids or gases.

The tubes are preferably formed to have an inner diameter of 0.05 inch or larger so as to facilitate the flow of the fluid therethrough and to reduce the risk of clogging therein, although tubes of smaller diameters may also be utilized should additional size and weight constraints be imposed upon the energy-exchange system.

While an inner skin may be utilized in some designs, such an inner skin is unnecessary for constraining the fluid flow with the capillary-tube energy-exchange system disclosed herein, as such a capillary-tube system limits the fluid flowing to the interior of the individual capillary tubes, while the tubes themselves are bonded to the inner surface of the outer skin.

Due to the use of Teflon tubes, the working fluid may be selected from any of a wide range of fluids, either liquid or gas, for circulation through the energy-exchange system. Typically, for ice protection of, or ice removal from, the exterior surface, a warm fluid is pumped through the energy-exchange system to warm the outer skin of the aircraft and melt or prevent the formation of ice. If such a system is a closed system, the fluid is subsequently passed through a heat exchanger which reheats the fluid prior to its being rerouted through the energy-exchange system again. If such a system is an open system, the fluid may be exhausted from the aircraft. While the typical utilization of such an energy-exchange system is to pass warm fluid through capillary tubes to prevent icing, cold fluids may also be utilized to cool the outer skin if the skin were becoming warmer than desired.

Typical fluids utilized include either air or liquids. Such a system utilizing air would likely be an open system, in which the circulated air would be discharged from the aircraft. Alternatively, a system utilizing a liquid such as Coolanol-25 or polyalphaolefin would be a closed system, wherein the liquid is recirculated.

In this disclosure, there is shown and described only preferred embodiments of the invention. Accordingly, changes and modifications in the specifically described embodiments can be carried out without departing from the spirit and scope of this invention which is intended to be limited only by the scope of the appended claims.

What is claimed is:

1. In combination with an aircraft structure having an outer skin and internal structural supports, a system for exchanging energy with said outer skin, comprising:
   (a) a working fluid for circulation within said system;
   (b) an inlet manifold for accepting said working fluid prior to exchanging energy with said outer skin, said inlet manifold having one or more outlet ports for discharging said fluid;
   (c) an exhaust manifold for accepting said working fluid following its exchanging energy with said outer skin, said exhaust manifold having one or more inlet ports for receiving said fluid;
   (d) a plurality of polytetrafluoroethylene tubes adhesively bonded to an interior surface of said outer skin and having a shape approximating that of said outer skin, said plurality of tubes connected at a first end to said one or more outlet ports of said inlet manifold and at a second end to said one or more inlet ports of said exhaust manifold and wherein an exterior surface of each of said plurality of tubes has been etched such that said tubes may be adhesively bonded to said interior surface of said outer skin; and
   (e) a pump means for circulating said working fluid through said system.

2. In combination with an aircraft structure having an outer skin and internal structural supports, a system for exchanging energy with said outer skin as recited in claim 1, wherein said plurality of tubes is positioned substantially parallel with respect to one another.

3. In combination with an aircraft structure having an outer skin and internal structural supports, a system for exchanging energy with said outer skin recited in claim 1 wherein said exterior surface of each of said plurality of tubes is etched with sodium napthalene.

4. In combination with an aircraft structure having an outer skin and internal structural supports, a system for exchanging energy with said outer skin recited in claim 1 wherein an interior diameter of each of said plurality of tubes is 0.05 inch or larger.

5. In combination with an aircraft structure having an outer skin and internal structural supports, a system for exchanging energy with said outer skin, comprising:
   (a) a working fluid for circulation within said system;
   (b) an inlet manifold for accepting said working fluid prior to exchanging energy with said outer skin, said inlet manifold having one or more outlet ports for discharging said fluid;
   (c) an exhaust manifold for accepting said working fluid following its exchanging energy with said outer skin, said exhaust manifold having one or more inlet ports for receiving said fluid;
   (d) a plurality of polytetrafluoroethylene tubes adhesively bonded to an interior surface of said outer skin and having a shape approximating that of said outer skin wherein an exterior surface of said tubes have been etched such that said tubes may be adhesively bonded to said interior surface of said outer skin;
   (e) a first wall extending from said outer skin to said supporting structural member, said first wall in combination with said outer skin, said supporting structural member, and a first end of said plurality of tubes forming a first chamber for accepting said fluid from said one or more outlet ports of said inlet manifold and discharging said fluid through said first end of said plurality of tubes;
   (f) a second wall extending from said outer skin to said internal supporting structural member, said second wall in combination with said outer skin, said supporting structural member, and a second end of said plurality of tubes forming a second chamber for accepting said fluid from a second end of said plurality of tubes and discharging said fluid through said one or more inlet ports of said exhaust manifold; and
   (g) a pump means for circulating said working fluid through said system.

6. In combination with an aircraft structure having an outer skin and internal structural supports, a system for exchanging energy with said outer skin as recited in claim 5 wherein said plurality of tubes are positioned substantially parallel with respect to one another.

7. In combination with an aircraft structure having an outer skin and internal structural supports, a system for exchanging energy with said outer skin recited in claim 5 wherein said exterior surface of each of said plurality of tubes is etched with sodium napthalene.

8. In combination with an aircraft structure having an outer skin and internal structural supports, a system for exchanging energy with said outer skin recited in claim 5 wherein an interior diameter of each of said plurality of tubes is 0.05 inch or larger.

9. In combination with an aircraft structure having an outer skin and internal structural supports, a system for exchanging energy with said outer skin, comprising:
   (a) a working fluid for circulation within said system;
   (b) an inlet manifold for accepting said working fluid prior to exchanging energy with said outer skin, said inlet manifold having one or more outlet ports for discharging said fluid;
   (c) an exhaust manifold for accepting said working fluid following its exchanging energy with said outer skin, said exhaust manifold having one or more inlet ports for receiving said fluid;
   (d) a plurality of first polytetrafluoroethylene tubes extending from said one or more outlet ports of said inlet manifold to a forward portion of said leading edge, said plurality of first tubes positioned within a cavity formed by said outer skin;
   (e) a plurality of second polytetrafluoroethylene tubes adhesively bonded to an interior surface of said outer skin and having a shape approximating that of said outer skin, said plurality of second tubes extending from a forward portion of said leading edge to said one or more inlet ports of said exhaust manifold and wherein an exterior surface of said plurality of second tubes have been etched such that said plurality of second tubes may be adhesively bonded to said interior surface of said outer skin; and
   (f) a pump means for circulating said working fluid through said system.

10. In combination with an aircraft structure having an outer skin and internal structural supports, a system for exchanging energy with said outer skin as recited in claim 9 wherein said plurality of first tubes are positioned substantially parallel with respect to one another and wherein said plurality of second tubes are positioned substantially parallel with respect to one another.

11. In combination with an aircraft structure having an outer skin and internal structural supports, a system for exchanging energy with said outer skin recited in claim 9 wherein said exterior surface of each of said plurality of second tubes is etched with sodium napthalene.

12. In combination with an aircraft structure having an outer skin and internal structural supports, a system for exchanging energy with said outer skin recited in claim 9 wherein an interior diameter of each of said plurality of first tubes and each of said plurality of second tubes is 0.05 inch or larger.

* * * * *